July 21, 1925.
V. RANDEL
1,546,866
DEVICE FOR REMOVING THE SKIN FROM SLICED BACON
Filed Feb. 26, 1925
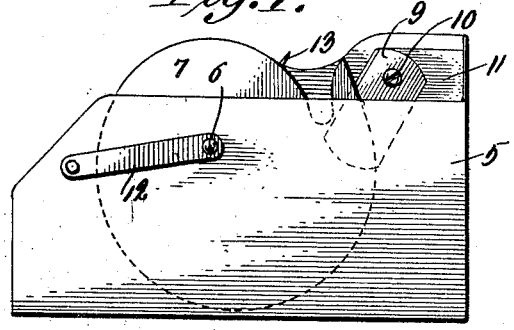
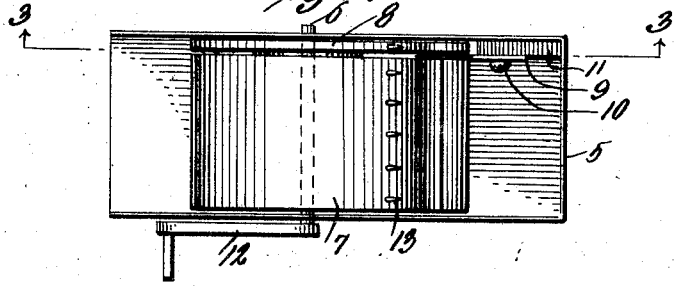
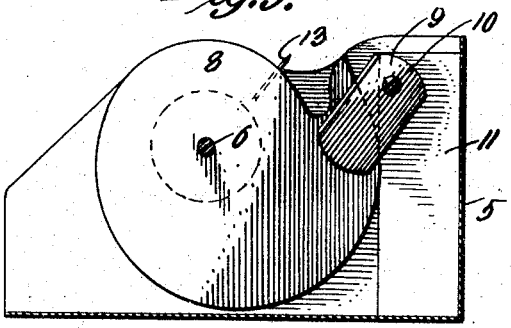
Inventor
VICTOR RANDEL Patented July 21, 1925.

1,546,866

UNITED STATES PATENT OFFICE.

VICTOR RANDEL, OF HUNTSVILLE, TEXAS.

DEVICE FOR REMOVING THE SKIN FROM SLICED BACON.

Application filed February 26, 1925. Serial No. 11,862.

*To all whom it may concern:*

Be it known that I, VICTOR RANDEL, a citizen of the United States, residing at Huntsville, in the county of Walker and State of Texas, have invented certain new and useful Improvements in Devices for Removing the Skin from Sliced Bacon, of which the following is a specification.

This invention relates to an improved device for removing the skin from sliced bacon by a cutting operation.

The primary object of the invention is to provide means for feeding the slices of bacon to the knife which slices or cuts the skin portion from the meat portion, whereby the slice of bacon is caused to travel relative to the edge of the knife or along said edge, so that the severing of the skin from the meat portion is rendered effective.

Another object of the invention is to provide a device of the above kind which is extremely simple and durable in construction as well as efficient in operation, so as to meet with all of the requirements for a successful commercial use.

With the above general objects in view, and others that will become apparent as the nature of the invention is better understood, the same consists in the novel form, combination and arrangement of parts hereinafter more fully described, shown in the accompanying drawing and claimed.

In the drawing, wherein like reference characters indicate corresponding parts throughout the several views, Figure 1 is a side elevational view of a device for removing the skin from sliced bacon and constructed in accordance with the present invention.

Figure 2 is a top plan view of the device shown in Fig. 1 and

Figure 3 is a longitudinal vertical section taken substantially upon a line 3—3 of Figure 2.

Referring more in detail to the drawing, the present invention consists of a suitable frame such as the sheet metal receptacle like frame 5 shown, in which is journaled a transverse horizontal shaft 6 upon which is secured a spiral cam drum composed of a relatively wide section 7 and a relatively narrow disc section 8. When the frame is constructed in the general form of a receptacle as shown, the top and one end thereof is left open as clearly illustrated in the several views, but it is to be understood that the construction and form of this frame may be varied greatly without departing from the spirit of the invention.

Suitably rigidly mounted in a vertical position at one side of the cam drum and with its cutting edge preferably disposed at an inclination, is a slicing or cutting knife 9, the lower portion of which projects into the space between the sections 7 and 8 of the cam drum as clearly shown. This knife may be detachably secured in place such as by means of a screw 10 passing through the blade and threaded into a post or upright 11, provided at one corner of the frame, and it is to be understood that the space between the drum sections 7 and 8 is only slightly greater than the thickness of the knife.

Means is provided for facilitating rotation of the drum, and as shown, this means may consist of a crank handle 12 fixed upon one end of the shaft 6.

Two or more small sharp prongs or spurs 13 are rigidly provided on the periphery of the cam drum at points in transverse alinement and at the innermost or substantially innermost portion of the drum periphery. In other words, the prongs or spurs 13 project from the periphery of the cam drum where the distance from the axis or shaft 6 to the periphery of the drum is the least, and these prongs or spurs are provided for holding the slice of bacon and causing it to be fed to the knife 9 when the drum is rotated. The prong or spur on the thin section 8 of the drum is adapted to hold the skin of the bacon and the prongs or spurs on the larger section 7 of the drum are adapted to hold the meat portion of the bacon.

The frame 5 of the device may be fastened to a table or other support by means of one or more small screws or by means of a small clamp, as is obvious.

In operation, the end of a strip or slice of bacon is engaged with the spurs 13 so that the meat portion of the slice of bacon rests upon the periphery of the wider drum section 7 and is engaged by the spurs carried by the latter, while the skin portion of the slice of bacon is engaged with the spur of the thin drum section 8 and rests upon the latter. The spiral cam drum is then revolved in a clockwise direction by turning the crank handle 12 so as to feed the strip of bacon against the cutting edge of the knife 9 and effect slicing or cutting of the skin from the meat portion. The spiral form of the drum causes the bacon to travel along the edge of or upwardly on the edge of the cutting blade 9 so that an effective cutting action is had and the desired result facilitated.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:—

1. A device for removing the skin from sliced bacon comprising a frame, a spiral cam drum journaled in said frame and comprising a relatively wide section and a relatively narrow section arranged in slightly spaced side by side relation, means to facilitate rotation of said drum, means to facilitate attachment of the end of a slice of bacon to the periphery of the drum adjacent the innermost part of the latter, and a slicing knife mounted on the frame and projecting between the drum sections.

2. A device for removing the skin from sliced bacon comprising a frame, a spiral cam drum journaled in said frame and comprising a relatively wide section and a relatively narrow section arranged in slightly spaced side by side relation, means to facilitate rotation of said drum, means to facilitate attachment of the end of a slice of bacon to the periphery of the drum adjacent the innermost part of the latter, and a slicing knife mounted on the frame and projecting between the drum sections, said knife being disposed with the cutting edge inclined and presented so as to engage the bacon when the latter is fed by turning the drum in a direction which affects movement of the drum so as to present portions of the latter which progressively increase in distance from the axis of the drum.

3. A device for removing the skin from sliced bacon comprising a frame, a spiral cam drum journaled in said frame and comprising a relatively wide section and a relatively narrow section arranged in slightly spaced side by side relation, means to facilitate rotation of said drum, means to facilitate attachment of the end of a slice of bacon to the periphery of the drum adjacent the innermost part of the latter, and a slicing knife mounted on the frame and projecting between the drum sections, the means for facilitating attachment of the slice of bacon to the drum comprising prongs, one of which is carried by the narrower drum section.

4. A device for removing the skin from a slice of bacon including a knife, and means embodying a spiral cam drum for supporting the slice of bacon and feeding it to the knife.

In testimony whereof I affix my signature in the presence of two witnesses.

VICTOR RANDEL.

Witnesses:
BEN W. YOUNG,
W. H. ADAMSON.